United States Patent [19]
Waseleski, Jr. et al.

[11] 3,824,579
[45] July 16, 1974

[54] APPARATUS FOR MONITORING BEARING TEMPERATURE AND FOR PROTECTING BEARING FROM OVERTEMPERATURE

[75] Inventors: Joseph W. Waseleski, Jr., Mansfield, Mass.; Ralph E. Charnley, Esmond, R.I.

[73] Assignee: Texas Instruments Incorporated, Dallas, Tex.

[22] Filed: Dec. 26, 1972

[21] Appl. No.: 318,044

[52] U.S. Cl. ........... 340/269, 200/DIG. 13, 308/1 A, 340/228 R, 200/DIG. 13
[51] Int. Cl. ......................................... G08b 21/00
[58] Field of Search ......... 340/269, 228 R; 308/1 A; 338/28

[56] References Cited
UNITED STATES PATENTS

| | | | |
|---|---|---|---|
| 2,379,317 | 6/1945 | Picciano | 338/28 |
| 3,521,212 | 7/1970 | Waseleski, Jr. et al. | 338/28 |
| 3,548,396 | 12/1970 | Roberts | 340/228 R |

Primary Examiner—John W. Caldwell
Assistant Examiner—Glen R. Swann, III
Attorney, Agent, or Firm—John A. Haug; McAndrews: James P.; Edward J. Connors, Jr.

[57] ABSTRACT

A system for monitoring and protecting a bearing employs a temperature responsive thermistor spring biased against the outer shell of the bearing. The thermistor preferably has a positive temperature coefficient of resistivity with a threshold or anomaly temperature for example of approximately 300°F above which the thermistor changes from a low resistance to a high resistance mode. The change in resistance is sensed by a protection circuit and a switch is actuated upon overheating of the bearing. The thermistor is disposed in a probe which is slidably mounted in a sensor head. A spring located in the head biases the probe outwardly, the outward motion being limited by stop surfaces. The sensor head is mounted in a housing containing the bearing such that in the absence of the bearing the probe would extend into the bearing cavity. Insertion of the bearing cams the probe toward the sensor head leaving the probe in close thermal contact with the bearing structure.

15 Claims, 4 Drawing Figures

APPARATUS FOR MONITORING BEARING TEMPERATURE AND FOR PROTECTING BEARING FROM OVERTEMPERATURE

BACKGROUND OF THE INVENTION

This invention relates to apparatus for monitoring the temperature of bearings and for providing an output signal upon an overtemperature which signal either shuts down associated equipment or provides indication of the condition as by energization of an indicator light. More particularly the invention relates to a PTC (positive temperature coefficient) sensor mounted in heat transfer relation to a bearing and adapted to energize a control circuit upon an overtemperature of the bearing.

A common problem associated with the use of machinery having rotating parts is the seizure of bearings in which the parts rotate. Normally when this happens the bearing must be replaced which not only entails disassembly of the associated equipment to get at the bearing but of course also results in down time of the equipment. Further, in many applications the shut down of a machine can affect an entire line of equipment. For example a bearing seizure in a Fourdrinier stops the output of that entire line and would cost many thousands of dollars each minute that the machine is down.

The most common reason for a bearing to seize is that the lubricant has broken down and lost its lubricating qualities. As a lubricant breaks down and the lubricant becomes less effective the temperature rises so that monitoring the temperature of a bearing can provide an opportunity to correct the problem, for instance by replacing the lubricant, before the bearing seizes.

Attempts have been made to provide protection against bearing seizures by locating thermocouples near the bearings in order to determine if a bearing is overheating; however, this has not been satisfactory for several reasons. Thermocouples are relatively expensive so that it becomes prohibitive from a cost standpoint to provide such sensors for a large number of bearings which would be required for complete protection of a line of equipment. Further, the location of the thermocouple in many bearings results in unwieldy lengths of leads extending from the thermocouples to the reference junctions resulting in loss of efficiency. Further still, due to the relatively small difference in output signal due to changes in temperature circuitry associated with the thermocouple must be especially sensitive and therefore is more subject to nuisance tripping.

SUMMARY OF INVENTION

Briefly in accordance with the present invention a steeply sloped PTC thermistor is mounted in optimum heat transfer relation with a bearing and is adapted to produce an output signal upon an overtemperature condition of the bearing which signal is used either to shut down the associated equipment or to energize an indicator alarm.

The steeply sloped PTC thermistor is particularly advantageous since there is a large change in the output signal for a very small change in temperature. The PTC thermistor is potted into the tip of a probe which is in turn slidingly mounted in a sensor head. The probe is biased in a direction tending to move it out of the head so that when mounted in a bearing housing the probe extends into the bearing cavity or seat area. Thus when the bearing is in place in the housing the probe is forced back into the head so that a close thermal coupling is achieved between the probe and the bearing. Thus the temperature of the PTC sensor closely follows the bearing temperature and should the bearing begin to overheat the PTC sensor changes from a low resistance mode to a high resistance mode and causes an output signal in an associated control circuit. Due to the large change in resistance the control circuit can be made so that it is insensitive to nuisance tripping.

Accordingly, among the several objects of the invention may be noted the provision of an apparatus which will monitor the temperature of the bearing and provide an output signal upon the occurrence of a predetermined temperature; the provision of such apparatus which is reliable yet inexpensive; the provision of apparatus which will not be subject to giving false indication or nuisance tripping; the provision of such apparatus employing thermistor sensing of the temperature of a bearing for deenergizing associated equipment upon overheating of the bearing; the provision of such apparatus which is relatively insensitive to variations in supply voltage and ambient temperatures and the provision of apparatus which has long life and is relatively simple and conducive to mass manufacture techniques.

The invention accordingly comprises the constructions hereinafter described, the scope of the invention being indicated in the appended claims.

BRIEF DESCRIPTION OF THE DRAWING

In the accompanying drawings, in which one of the possible embodiments is illustrated.

DESCRIPTION OF THE PREFERRED EMBODIMENT

Figure 1:
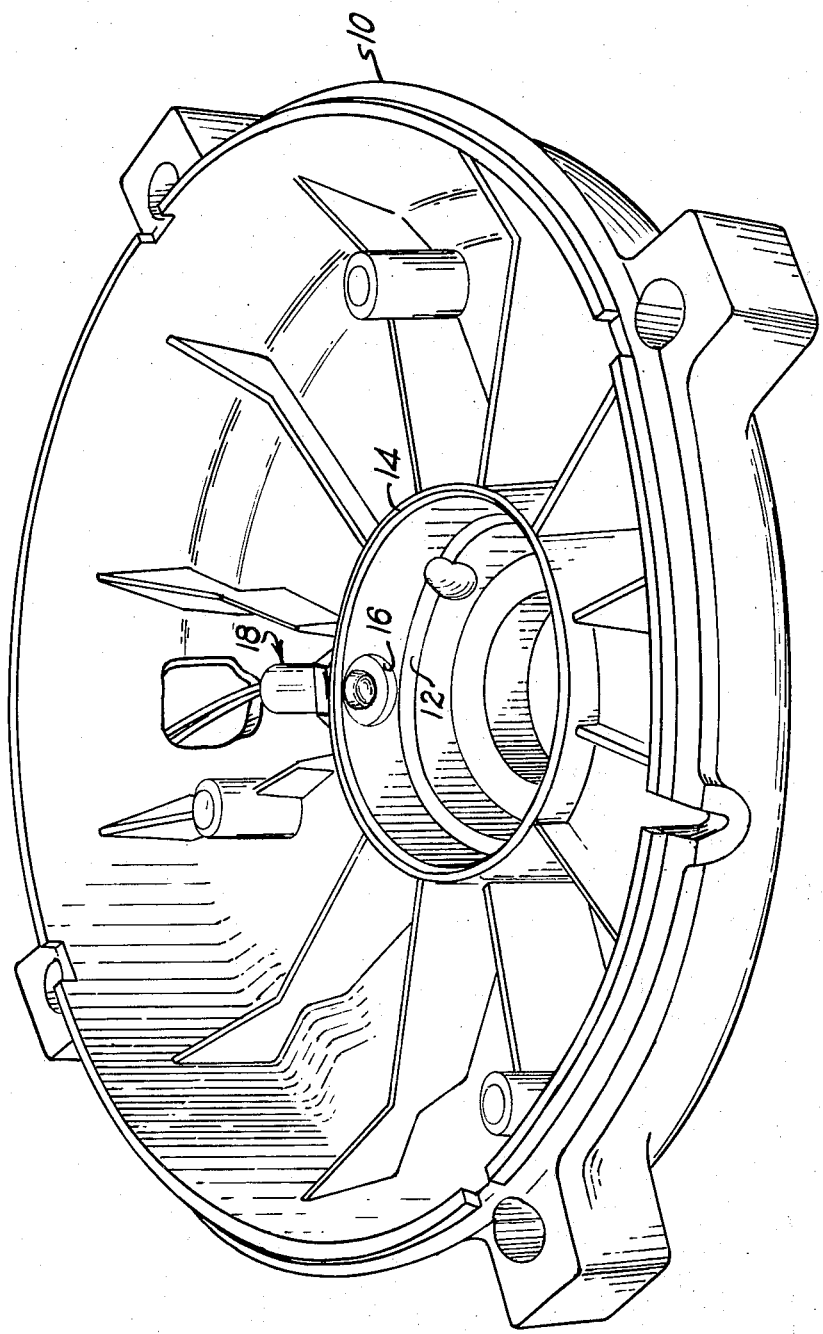
FIG. 1 is a perspective of an end bell of a motor in which a bearing monitor/protector made in accordance with the invention has been mounted adjacent to the bearing seat or cavity.

Corresponding reference characters indicate corresponding parts throughout the several views of the drawings.

Figure 2:
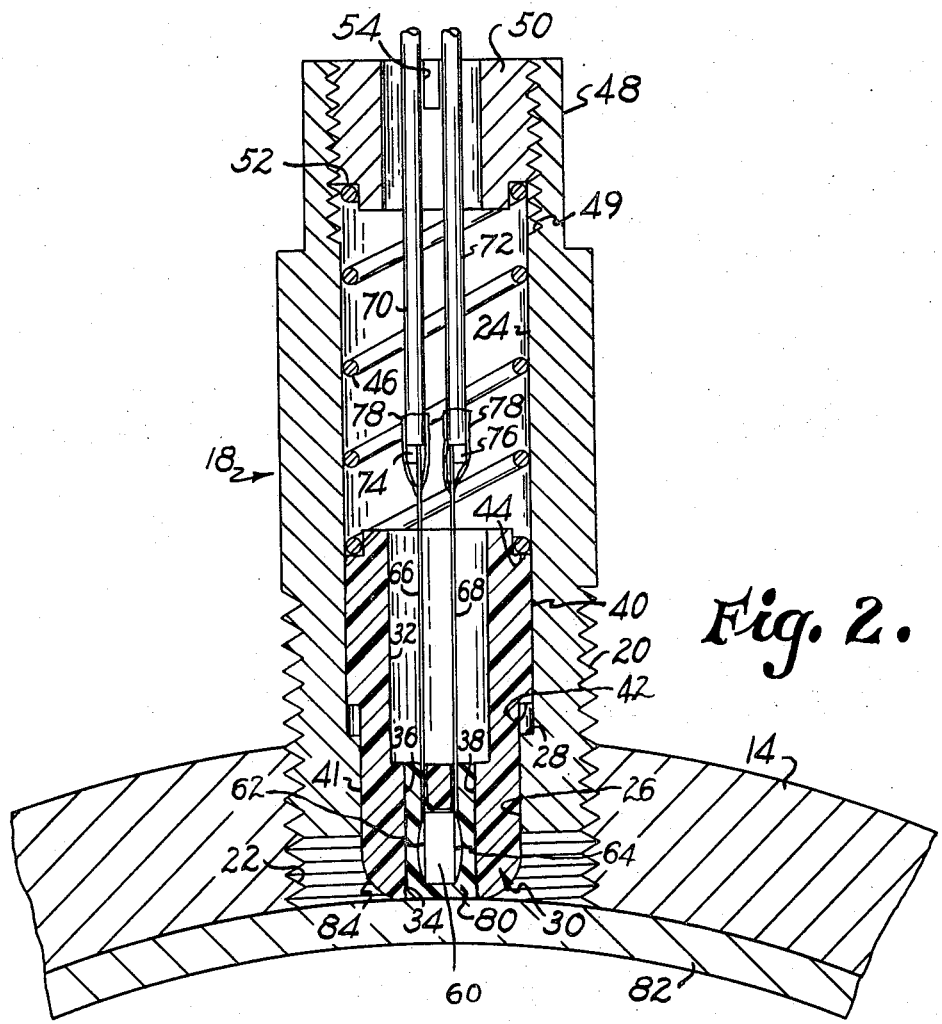
FIG. 2 is a cross section of the bearing monitor/protector shown in FIG. 1 and also showing the outer shell of a bearing to be monitored/protected.

Referring now to FIG. 1 there is shown a typical end bell 10 of a motor housing for mounting a bearing assembly. The outer shell of the bearing is disposed against annular flange 12 formed in hub 14 of the bell. Bore 16 is formed in hub 14 for reception of sensor head 18. As seen in FIG. 2 sensor head 18 is provided with male threaded portion 20 on one end thereof, bore 16 also being threaded at 22. Head 18 is provided with bore 24 with a reduced diameter bore portion 26. Bore 24 and reduced diameter portion 26 form an annular stop surface 28. Reduced diameter portion 26 also serves to slidingly mount probe 30. Probe 30 has a first longitudinally extending bore 32 extending from one end and a second longitudinally extending bore 34 extending from the opposite end. Two smaller bores 36, 38 communicate with bores 32, 34.

Probe 30 has first enlarged diameter portion 40 which slidingly fits in bore 24 of head 18 and a second smaller diameter portion 41 which slidingly fits in bore 26 of head 18. Enlarged diameter portion 40 forms with bore portion 41 an annular stop surface 42 which cooperates with stop surface 28 of head 18 to limit outward movement of probe 30 in head 18. Spring seat 44 is formed at the inner end of probe 30 for reception of coil spring 46 which applies a bias to the probe tending to cause it to move out of head 18.

Bore 24 is threaded at end 48 of head 18 as shown at 49 for insertion of threaded member 50 which is provided with spring seat 52 for the other end of spring 46. Member 50 can be moved in or out as desired by any conventional means as by insertion of a tool into slot 54 to adjust the amount of bias of spring 46. A pill 60 of temperature responsive material such as material having a positive temperature coefficient (PTC) of resistivity is inserted in bore 34 of probe 30. The thermistor pill 60 is composed of well known material, preferably having a steeply sloped positive temperature coefficient (PTC) of resistivity. These materials have a relatively constant or low mode of resistance for increase in temperature until a particular threshold temperature is reached whereupon at the threshold or anomaly temperature, the temperature coefficient of the material increases dramatically to a high resistance mode with a very slight increase in temperature. The PTC sensors are usually formed of doped barium titanate, the anomalous behavior being caused by a change in the crystal structure of the doped barium titanate structure. The characteristic anomaly temperature and resultant temperature coefficient are determined by the chemical composition of the doped barium titanate. Resistance changes of the PTC material in the steeply sloped region immediately above the anomaly temperature in the range of 25 to 150 percent per degree centigrade. Opposite faces of pill 60 are provided with electrically conductive coatings 62, 64 respectively. Respective electrically conductive leads 66, 68 are connected thereto as by soldering and extend therethrough to respective apertures 36, 38. Leads 66, 68 are electrically connected in any suitable manner to insulated wires 70, 72 as by crimp connectors 74, 76. These connections are preferably covered with a layer of electrically insulative material such as a heat shrinkable plastic 78. Pill 60 is potted in place with heat conductive, electrically insualting material 80.

FIG. 2 shows the outer shell 82 of a bearing whose temperature is to be sensed. Probe 30 is biased into firm heat conductive contact with shell 82 (which may for instance be the outer race of the bearing). Prior to insertion of the bearing probe 30 would be disposed further in a downward direction as viewed in FIG. 2, this motion limited when stop surfaces 42, 28 engage. The outer end of probe 30 is formed with a radius 84 so that when the bearing is inserted into its seat it will cam the probe inwardly.

Figure 3:
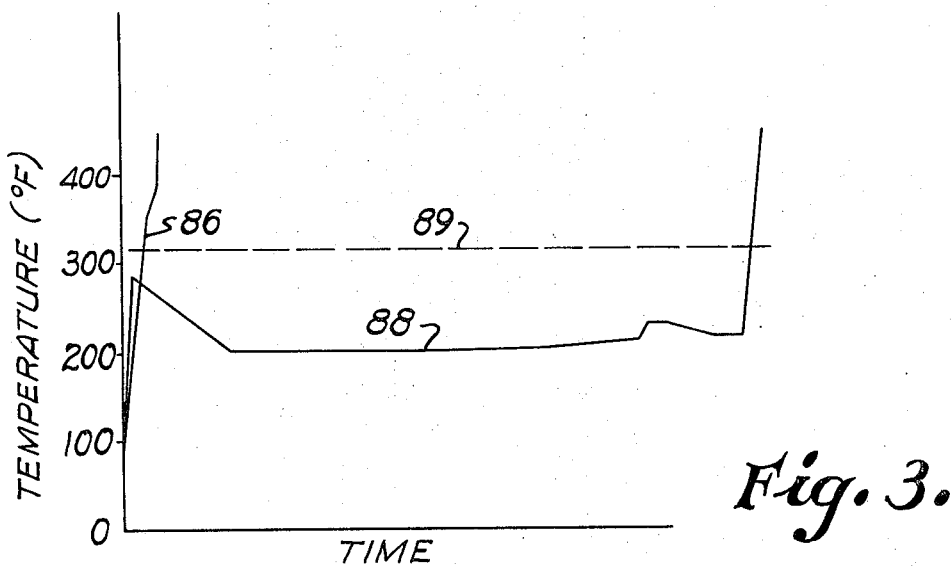
FIG. 3 shows temperature of the outer shell of a bearing versus bearing life for two exemplary bearings.

FIG. 3 shows a curve of temperature versus time of bearings using two different lubricants under test conditions chosen to reduce early failure including a high radial load and an elevated ambient temperature. As mentioned above, the most common bearing seizure is caused by the breakdown of the lubricant. As the lubricant breaks down it loses its lubricating qualities and the bearing seizes. However, increased temperatures resulting from deteriorating lubricating conditions can be detected. Curve 86 represents a bearing using a particularly poor lubricant while curve 88 represents a bearing using a normal lubricant.

After small peaks which normally occur at the beginning of a run as seen by curve 88 the temperature of the bearing remains relatively stable until a point just before catastrophic failure. During this final phase the temperature increases over a period of several minutes to a few hours before bearing seizure takes place. Bearings can be protected by selecting the PTC thermistor so that its threshold temperature, as indicated by dashed line 89 falls in the range just above the initial peak for the case of the normal lubricant but well below the point where ultimate failure occurs for either curve 86 or 88 which may be approximately 300°F for a grease type or 180°F for an oil type lubricant.

Figure 4:
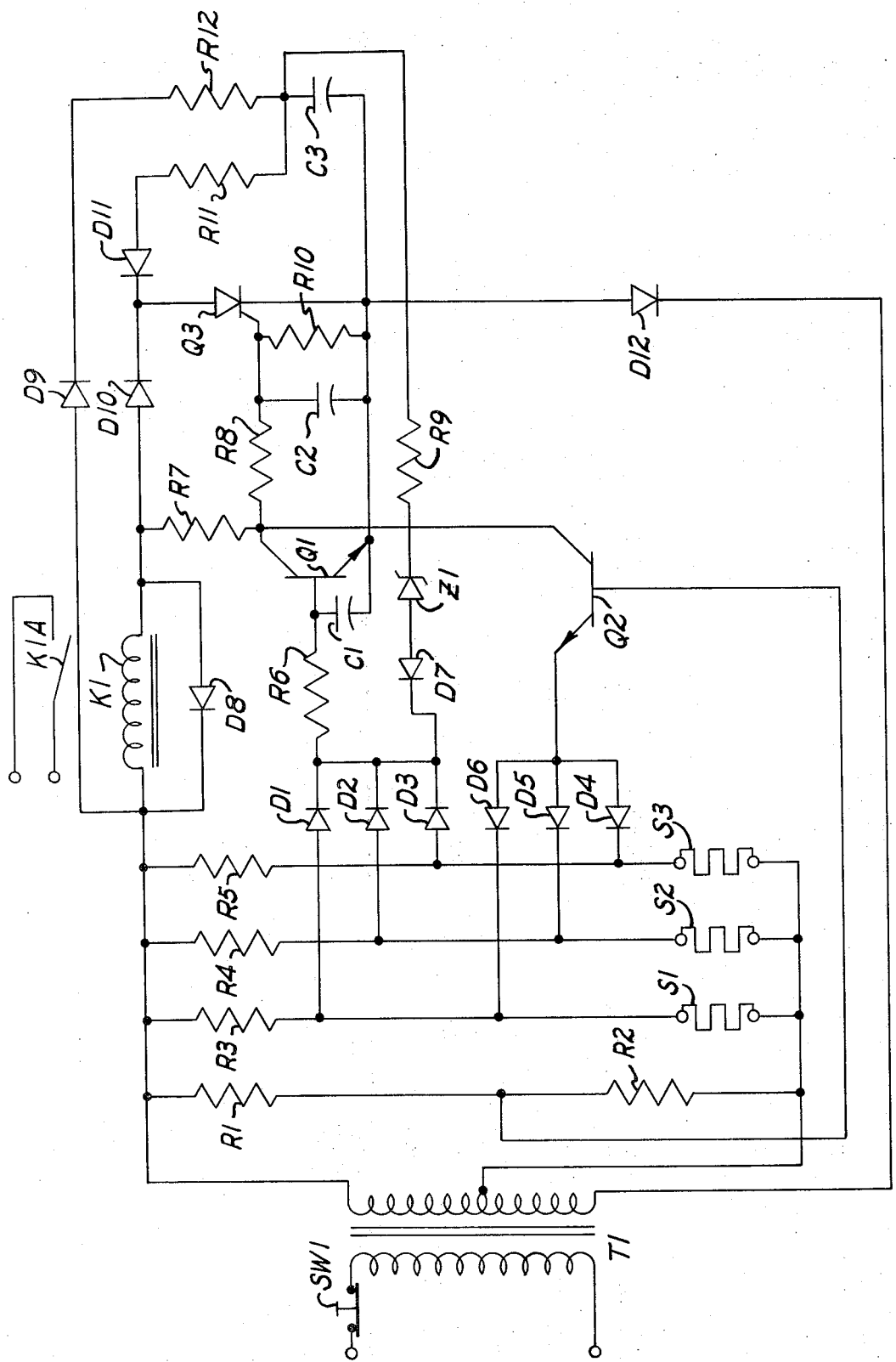
FIG. 4 shows a control circuit useful with the bearing monitor/protector of FIGS. 1 and 2.

The FIG. 1, 2 apparatus may be used to protect the bearing from overheating with a circuit utilizing the characteristics of the particular pill employed. For instance where a PTC pill is employed it may be used with the electronic protection system disclosed and claimed in copending coassigned application Ser. No. 316,194 filed Dec. 18, 1972, to which reference may be had for further details and explanation. In the circuit several bearings can be monitored at the same time utilizing sensors S1, S2 and S3. Pill 60 constitutes S1 while S2 and S3 can constitute similar bearing sensors or, if desired monitor the temperature of some other member such as a motor winding. It will be understood that if preferred only one or two sensors can be used in the circuit. As seen in FIG. 4 the center-tapped transformer T1 forms one-half of an a.c. bridge and works in conjunction with voltage dividers R3–S1, R4–S2 and R5–S3, each of which forms a separate second half of the bridge. The individual bridge circuits are brought into unbalance by the actions of the sensors S1–S3 whose resistance values may vary as a function of the temperature being measured.

A detector-amplifier is connected across the bridge circuits between the center tap of transformer T1 and the mid points of the resistors R3 to R5 and their respective sensors S1 to S3. This detector-amplifier comprises transistor Q1, resistor R6 and capacitor C1. The latter component provides stability to transistor Q1 to prevent oscillation. Logic for the three channels shown is provided by diodes D1, D2 and D3 which prevents interaction between the three parallel voltage dividers. Transistor Q1 will conduct any time its base-emitter junction is forward biased and this occurs whenever the voltage across any sensor S1 through S3 increases above or decreases below a predetermined level determined by the constants of the circuit. This action causes the voltage at the junction between resistor R7 and resistor R8 to closely approach the value appearing at the cathode of the SCR Q3, thus greatly reducing the gate potential thereof. In all instances, the circuit is operating only on the positive half cycles as measured from the top of the transformer secondary with respect to its lower end.

The control output comprises SCR Q3, relay K1, and K1A, diodes D8 and D12, resistors R7, R8 and R10 and capacitor C2. Power is applied to the relay K1 by action of the SCR Q3 which controls current to the upper half of the transformer secondary. Diode D8 is a freewheeling diode placed across the relay coil to permit half wave operation of a.c. relay K1. Diode D12 is series connected with the relay K1 and SRC Q3 to provide transient and reverse bias protection to the said SCR device.

In normal operation, the SCR Q3 is conducting as a result of gate current supplied through resistors R7 and R8. Resistor R10 is a relatively low value resistor which provides an essentially constant impedance to the amplifier Q1. Capacitor C2 improves the transient characteristics of the SCR gate circuit. The SCR Q3 ceases conduction whenever transistor Q1 conducts and bypasses gate current conduction to the cathode of the SCR. The normally open contact K1A of relay K1 functions as the power circuit element to the external load which might be a contactor, solenoid, or the like.

Protection against short circuits across the sensors or impedance below a predetermined value across the sensors S1 to S3 is provided through transistor Q2 which functions as a second detector between the voltage divider channels containing the sensors S1 to S3 and a separate voltage divider circuit comprising resistors R1 and R2. This forms another bridge circuit using diode logic for isolation composed of diodes D4, D5 and D6 which controls the gate current to the SCR Q3 independently of the transistor Q1. Whenever the resistance of a sensor input S1 to S3 falls below a predetermined preset limit, transistor Q2 is caused to conduct by the bridge unbalance and shunts gate current away from the SCR Q3. The short circuit resistance level where this action occurs is determined by the ratio of R1 and R2 and can be varied over a moderately large span.

The circuit of FIG. 4 is for a manual reset load and includes the reset switch S1 in the primary side of the transformer T1. To prevent circuit oscillation and to guarantee positive system lockout on a trip or alarm condition, the components diodes D7, D9, D10, D11, zener diode Z1, resistor R9 and capacitor C3 which comprise the lockout circuit come into play. On alarm condition such as a bearing overheating causing one of the sensors (S1, S2, or S3) to go into its high resistance mode, the SCR Q3 ceases conduction and blocks the transformer supply voltage. This voltage is rectified by diode D9 and applied to the RC circuit comprising resistor R12 and capacitor C3. This DC voltage level is fed back to the base of transistor Q1 via resistor R9, zener diode Z1 and diode D7 which holds the output in the off condition as input voltage is available to the transformer T1. Upon removal of the alarm condition, the operation of the device under protection (that is, the machine in which the bearing is disposed) can be restored by reset of the protective circuit. This is provided by removing power at the primary of transformer T1 by opening the normally closed reset switch SW1, thereby allowing the charge of the capacitor C3 to quickly bleed off. The protective circuit will not reset if any of the sensors S1, S2, or S3 is in the high resistance mode. Diode D11 and resistor R11 prevent voltage buildup on capacitor C3 during the time when the SCR Q3 is conducting. Diode D10 prevents discharge of capacitor C3 back through resistors R7, R8 and R10.

Thus the PTC thermistor of the invention, mounted in optimum heat transfer relation with a bearing to be monitored and protected produces a signal upon overheating of the bearing which can be used to provide visual indication of such overheating as by an indicator light or it can shut down the associated equipment so that this condition causing the overheating can be rectified before a bearing seizure occurs.

Although the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

We claim:

1. A bearing protection system comprising an outer shell of a bearing, a housing for mounting the bearing, the housing having an aperture in alignment with the outer shell, a sensor head mounted in the aperture, a bore located in the head in communication with the outer shell, the bore closed at one end, a first spring seat provided at the closed end, a probe movably mounted in the bore of the head, a second spring seat provided on the probe, means for biasing the probe into intimate heat transfer contact with the outer shell, the biasing means comprising a coil spring located between the first and second spring seats, a temperature responsive thermistor disposed in the probe adjacent an outer surface thereof, a source of power and a switch in series with the source of power, and circuit means responsive to an overtemperature condition of the thermistor to open the switch.

2. A bearing protection system comprising a source of power, a switch in series with the source of power, circuit means including a temperature responsive thermistor responsive to an overtemperature condition to open the switch, a head having first and second ends with a bore extending therebetween, the bore closed at one end, a first spring seat provided at the closed end, a probe having a tip slidingly disposed in the bore, a second spring seat provided on the probe, means biasing the probe tending to move it out of the head, the biasing means comprising a coil spring located between the first and second spring seats, means limiting the outward movement of the probe, the thermistor disposed in the tip of the probe, a bearing housing having a threaded aperture therein aligned with a bearing seat in the housing, the head being threaded and inserted in the housing aperture so that the probe tip is biased against a bearing disposed in the housing.

3. Apparatus according to claim 2 in which the thermistor has a positive temperature coefficient of resistance.

4. Apparatus according to claim 3 in which the thermistor has a threshold temperature of approximately 300°F.

5. Bearing temperature sensor apparatus comprising a sensor head having first and second ends with a bore extending therebetween, the bore threaded at one end, a threaded plug, the threaded plug received in the one end, a probe having a tip slidingly disposed in the bore, a first spring seat provided on the plug, a second spring seat provided on the probe, means biasing the probe tending to move it out of the head, the biasing means comprising a coil spring located between the first and second spring seats, means limiting the outward movement of the probe, a temperature responsive thermistor disposed in the tip of the probe, and means for mounting the head adjacent a bearing.

6. Apparatus according to claim 5 in which the means limiting the outward movement of the probe comprises stop surfaces formed in the bore of the head and on the probe.

7. Apparatus according to claim 5 in which the tip is formed with a cam surface so that when a bearing is slid into its seat the bearing cams the tip toward the head resulting in close thermal contact between the tip and the bearing.

8. Apparatus according to claim 5 in which the thermistor has a positive temperature coefficient of resistance.

9. Apparatus according to claim 8 in which the thermistor is composed of a doped barium titanate and is steeply sloped at temperatures above a threshold temperature.

10. Apparatus according to claim 6 in which the head and the probe are generally cylindrical, the stop surfaces on the head and probe are annular flanges formed by the junction between two different diameter portions on both the head and the probe.

11. Apparatus according to claim 5 in which the bore is threaded at one end and a threaded plug is received in the one end, a first spring seat is provided on the plug and a second spring seat is provided on the probe, the biasing means comprising a coil spring located between the first and second spring seats.

12. Apparatus according to claim 11 in which the plug is provided with a bore extending therethrough, the thermistor is provided with two leads which extend from the thermistor out through the head and the plug bore.

13. Apparatus according to claim 12 in which the probe has an aperture provided in the tip thereof, the thermistor is disposed in the aperture and the reamining portion of the aperture is filled with thermally conductive electrically insulation potting material.

14. Apparatus according to claim 9 in which the threshold temperature of the thermistor is approximately 300°F.

15. Apparatus according to claim 9 in which the threshold temperature of the thermistor is approximately 180°F.

* * * * *